US009642093B2

(12) United States Patent
Festag et al.

(10) Patent No.: US 9,642,093 B2
(45) Date of Patent: May 2, 2017

(54) METHOD AND SYSTEM FOR OPERATING STATIONS IN A COOPERATIVE STATION NETWORK

(71) Applicant: NEC EUROPE LTD., Heidelberg (DE)

(72) Inventors: Andreas Festag, Dresden (DE);
Esteban Egea-López, Cartagena (ES);
Juan Jose Alcaraz Espin, Cartagena (ES); Javier Vales-Alonso, Vigo (ES);
Joan Garcia-Haro, Cartagena (ES)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/430,234

(22) PCT Filed: Mar. 18, 2013

(86) PCT No.: PCT/EP2013/055564
§ 371 (c)(1),
(2) Date: Mar. 23, 2015

(87) PCT Pub. No.: WO2014/044415
PCT Pub. Date: Mar. 27, 2014

(65) Prior Publication Data
US 2015/0230188 A1 Aug. 13, 2015

(30) Foreign Application Priority Data
Sep. 24, 2012 (EP) ..................... 12185621

(51) Int. Cl.
*H04W 52/24* (2009.01)
*H04L 29/08* (2006.01)
(Continued)

(52) U.S. Cl.
CPC ........... *H04W 52/242* (2013.01); *H04L 67/12* (2013.01); *H04W 52/243* (2013.01);
(Continued)

(58) Field of Classification Search
CPC .................................................. H04W 52/242
See application file for complete search history.

(56) References Cited

U.S. PATENT DOCUMENTS

| 5,146,454 A | * | 9/1992 | Courtois | ............. H04L 12/5602 370/231 |
| 2004/0198370 A1 | * | 10/2004 | Braun | ................. H04W 52/343 455/452.2 |

(Continued)

FOREIGN PATENT DOCUMENTS

WO    WO 2008069578 A1    6/2008

OTHER PUBLICATIONS

Torrent-Moreno M et al: "Vehicle-to-Vehicle Communication: Fair Transmit Power Control for Safety-Critical Information", IEEE Transactions on Vehicular Technology, vol. 58, No. 7, Sep. 1, 2009, pp. 3684-3703, XP011267844.

(Continued)

*Primary Examiner* — John Blanton
(74) *Attorney, Agent, or Firm* — Leydig, Voit & Mayer, Ltd.

(57) ABSTRACT

A method for operating a plurality of stations in a cooperative station network, wherein each of the stations transmits signals and receives signals from other stations, includes determining a path loss between at least two of the stations. A carrier sense range for signals of a first station of the stations is determined based on the path loss and received power of signals from the other stations. A load on a dedicated signal exchange channel is determined based on the determined carrier sense range. A maximum output power for the first station is determined based on the determined load. The first station is operated by adjusting
(Continued)

the output power of the first station to be, at least on average below the determined maximum output power for the first station.

21 Claims, 2 Drawing Sheets

(51) Int. Cl.
 H04W 84/18 (2009.01)
 H04W 88/08 (2009.01)
(52) U.S. Cl.
 CPC ....... *H04W 52/245* (2013.01); *H04W 52/246* (2013.01); *H04W 84/18* (2013.01); *H04W 88/08* (2013.01)

(56) References Cited

U.S. PATENT DOCUMENTS

| | | | | |
|---|---|---|---|---|
| 2007/0054670 | A1* | 3/2007 | Kalika | H04L 12/2456 455/446 |
| 2008/0068217 | A1* | 3/2008 | Van Wyk | G01D 4/004 340/870.11 |
| 2008/0102881 | A1* | 5/2008 | Han | H01Q 3/30 455/522 |
| 2008/0253300 | A1* | 10/2008 | Wakabayashi | H04B 17/336 370/252 |
| 2010/0034256 | A1* | 2/2010 | Bennett | H04N 7/24 375/240.01 |
| 2010/0118812 | A1* | 5/2010 | Kim | H04W 72/082 370/329 |
| 2010/0202417 | A1* | 8/2010 | Denteneer | H04W 74/0816 370/336 |
| 2010/0284303 | A1* | 11/2010 | Catovic | H04W 24/02 370/254 |
| 2010/0302961 | A1* | 12/2010 | Timmers | H04L 43/0888 370/252 |
| 2010/0317383 | A1* | 12/2010 | Lee | H04W 52/242 455/501 |
| 2013/0234861 | A1* | 9/2013 | Abrahamson | A61N 1/37223 340/870.02 |
| 2014/0036727 | A1* | 2/2014 | Chung | H04W 40/08 370/254 |
| 2014/0206407 | A1* | 7/2014 | Kim | H04W 8/005 455/515 |
| 2015/0085996 | A1* | 3/2015 | Mohseni | H04M 3/085 379/22.04 |

OTHER PUBLICATIONS

ETSI TS 102 687 V1.1.1, "Intelligent Transport Systems (ITS); Decentralized Congestion Control Mechanisms for Intelligent Transport Systems operating in the 5 GHz range; Access layer part", Jul. 2011, pp. 1-45.

ETSI EN 302 663 V1.2.0, "Intelligent Transport Systems (ITS); Access layer specification for Intelligent Transport Systems operating in the 5GHz frequency band", Nov. 2012, pp. 1-24.

* cited by examiner

METHOD AND SYSTEM FOR OPERATING STATIONS IN A COOPERATIVE STATION NETWORK

CROSS-REFERENCE TO PRIOR APPLICATIONS

This application is a U.S. National Phase application under 35 U.S.C. §371 of International Application No. PCT/EP2013/055564, filed on Mar. 18, 2013, and claims benefit to European Patent Application No. EP 12185621.5, filed on Sep. 24, 2012. The International Application was published in English on Mar. 27, 2014 as WO 2014/044415 under PCT Article 21(2).

FIELD

The present invention relates to a method for operating stations in a cooperative station network, preferably a vehicular ad hoc network, wherein the stations transmit signals and receive signals from other stations.

The present invention also relates to a system for operating stations in a cooperative station network, preferably a vehicular ad hoc network, wherein stations transmit signals and receive signals from other stations.

BACKGROUND

Although applicable to cooperative networks in general, the embodiments of the present invention will be described with regard to a vehicular cooperative network.

Cooperative vehicular networks or systems are used to increase road safety and traffic efficiency. Such cooperative vehicular networks may be based on wireless communication based on IEEE 802.11 wireless LAN technology among vehicles and between vehicles and a roadside infrastructure, for example roadside infrastructure nodes according to IEEE 208.11p and/or its European variant according to ETSI EN 302 663 "Intelligent Transport Systems" (ITS).

In cooperative vehicular networks the stations are vehicles, i. e. highly dynamic nodes with challenging propagation conditions. For a communication between vehicles a dedicated spectrum in the 5 GHz range was allocated. In a scenario with many nodes and with a high data rate from corresponding applications using these communication channels the communication channels can easily be saturated. This saturation leads to an unreliable communication between the vehicles and therefore in an inefficient operation of the cooperative vehicular network. In saturated conditions, the time for accessing a communication channel is significantly increased and the probability of packet reception is decreased at all distances or in other words packet loss is increased.

Due to a lack of coordinating infrastructure in cooperative vehicular networks cooperation has to be performed in a decentralized manner. For example for safety reasons vehicles may send periodic status messages to advertise their presence to other vehicles. These periodic messages opposed to event-driven messages are the basis for many safety applications like electronic break light, etc. and they may contribute considerably to the load on the wireless communication channels.

In order to control the load on these wireless communication channels the transmit power respectively output power of stations/nodes, here vehicles, in the cooperative vehicular network may be adjusted according to the actual load on the communication channels in the cooperative vehicular network. By decreasing the transmit power of a sent packet, this also reduces the spatial coverage and hence the load at a particular location in the communication range of the vehicle sending out the packet. Further conventional options to control congestion on the wireless communication channel include for example adjusting the packet generation rate, the carrier sense threshold or a combination of both of them.

For adjustment of the transmit power a so-called transmit power control TPC was proposed for congestion control by ETSI TS 102 687 and further D-FPAV, which was defined in Torrent-Moreno, M.; Mittag, J.; Santi, P.; Hartenstein, H., "Vehicle-to-vehicle Communication: Fair Transmit Power Control for Safety-Critical Information", IEEE Transactions on Vehicular Technology, vol. 58, no. 7, pp. 3684-3703, September 2009. (DFPAV), also available in M. Sepulcre, J. Mittag, P. Santi, H. Hartenstein, and J. Gozalvez, "Congestion and Awareness Control in Cooperative Vehicular Systems," Proceedings of the IEEE, vol. 99, no. 7, pp. 1260-1279, July 2011.

D-FPAV is a transmit power control algorithm achieving congestion control under so-called fairness constraints. The term "Fairness" may for example be defined as in M. Torrent-Moreno, P. Santi, and H. Hartenstein, "Fair sharing of bandwidth in VANETs," in Proceedings of the 2nd ACM international workshop on Vehicular ad hoc networks (VANET), 2005, pp. 49-58.

Congestion control in the wireless communication channel is according to D-FPAV achieved by exchanging of neighbour position information piggybacked in extended beacon signals from the vehicles. The added control information causes overhead scaling with the number of neighbour nodes/vehicles. Another alternative to reduce the overhead is to estimate the node density around every node and exchange a constant-size histogram of the node density in road segments as proposed in Mittag, J.; Schmidt-Eisenlohr, F.; Killat, M.; Harri, J.; Hartenstein, H., "Analysis and Design of Effective and Low-Overhead Transmission Power Control for VANETs", Proceedings of the fifth ACM VANET 2008 (DVDE/SPAV).

Further conventional methods defining a packet rate control opposed to transmit power control for example available in the documents of H. Busche, C. Khorakhun, and H. Rohling, "Self-Organized Update Rate Control for Inter-Vehicle Networks," in Proceedings of the 7th International Workshop on Intelligent Transportation (WIT 2010), 2010, of J. B. Kenney, G. Bansal, C. E. Rohrs, "LIMERIC: a linear message rate control algorithm for vehicular DSRC systems," Eighth ACM international workshop on Vehicular inter-networking (VANET 2011), pp. 21-30, 2011, of C. Sommer, O. K. Tonguz, and F. Dressler, "Traffic information systems: efficient message dissemination via adaptive beaconing," IEEE Communications Magazine, vol. 49, no. 5, pp. 173-179, May 2011, of M. Sepulcre and J. Gozalvez, "Adaptive wireless vehicular communication techniques under correlated radio channels," in Proceedings of the 69th IEEE Vehicular Technology Conference (VTC Spring), 2009, pp. 1-5 and of T. Tielert, D. Jiang, Q. Chen, L. Delgrossi, H. Hartenstein, "Design methodology and evaluation of rate adaptation based congestion control for Vehicle Safety Communications," Vehicular Networking Conference (VNC), 2011 IEEE, pp. 116-123, 2011.

Further conventional methods use an adaptation of the clear channel assessment (CCA) threshold, i.e. the threshold to detect and decode an incoming frame, for example described in the document of R. K. Schmidt, A. Brakemeier, T. Leinmüller, F. Kargl, and G. Schäfer, "Advanced carrier sensing to resolve local channel congestion," in Proceedings of the Eighth ACM international workshop on Vehicular inter-networking (VANET 2011), 2011, pp. 11-20.

Even further other conventional methods combine transmit power control and rate control for congestion control of the wireless communication channel, for example as described in the documents of R. Baldessari, L. Le, W. Zhang, A. Festag: "Joining Forces for VANETs: A Combined Transmit Power and Rate Control Algorithm", 7th International Workshop on Intelligent Transportation (WIT 2010), March 2010. (Combined rate and power control), of L. Le, R. Baldessari, P. Salvador, A. Festag, and Wenhui Zhang, "Performance Evaluation of Beacon Congestion Control Algorithms for VANETs," in Global Telecommunications Conference (GLOBECOM), 2011, pp. 1-6, of C. Khorakhun, H. Busche, and H. Rohling, "Congestion Control for VANETs based on Power or Rate Adaptation," in Proceedings of the 5th International Workshop on Intelligent Transportation (WIT 2008), 2008, of M. Sepulcre, J. Gozalvez, and H. Hartenstein, "Application-Based Congestion Control Policy for the Communication Channel in VANETs," IEEE Communications Letters, vol. 14, no. 10, pp. 951-953, 2010, of M. Sepulcre, J. Mittag, P. Santi, H. Hartenstein, and J. Gozalvez, "Congestion and Awareness Control in Cooperative Vehicular Systems," Proceedings of the IEEE, vol. 99, no. 7, pp. 1260-1279, July 2011 and of C.-L. Huang, Y. P. Fallah, R. Sengupta, and H. Krishnan, "Adaptive Intervehicle Communication Control for Cooperative Safety Systems," IEEE Network, vol. 24, no. 1, pp. 6-13, 2010.

These conventional congestion control methods may be classified into proactive, reactive and hybrid methods. Reactive methods use information about the general congestion status based on local information or remote information transmitted from other nodes. Proactive methods estimate the transmission parameters that do not lead to congestion. Hybrid methods combine proactive and reactive methods.

SUMMARY

In an embodiment, the present invention provides a method for operating a plurality of stations in a cooperative station network, wherein each of the stations transmits signals and receives signals from other stations. A path loss is determined between at least two of the stations. A carrier sense range for signals of a first station of the stations is determined based on the path loss and received power of signals from the other stations. A load on a dedicated signal exchange channel is determined based on the determined carrier sense range. A maximum output power for the first station is determined based on the determined load. The first station is operated by adjusting the output power of the first station to be, at least on average below the determined maximum output power for the first station.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
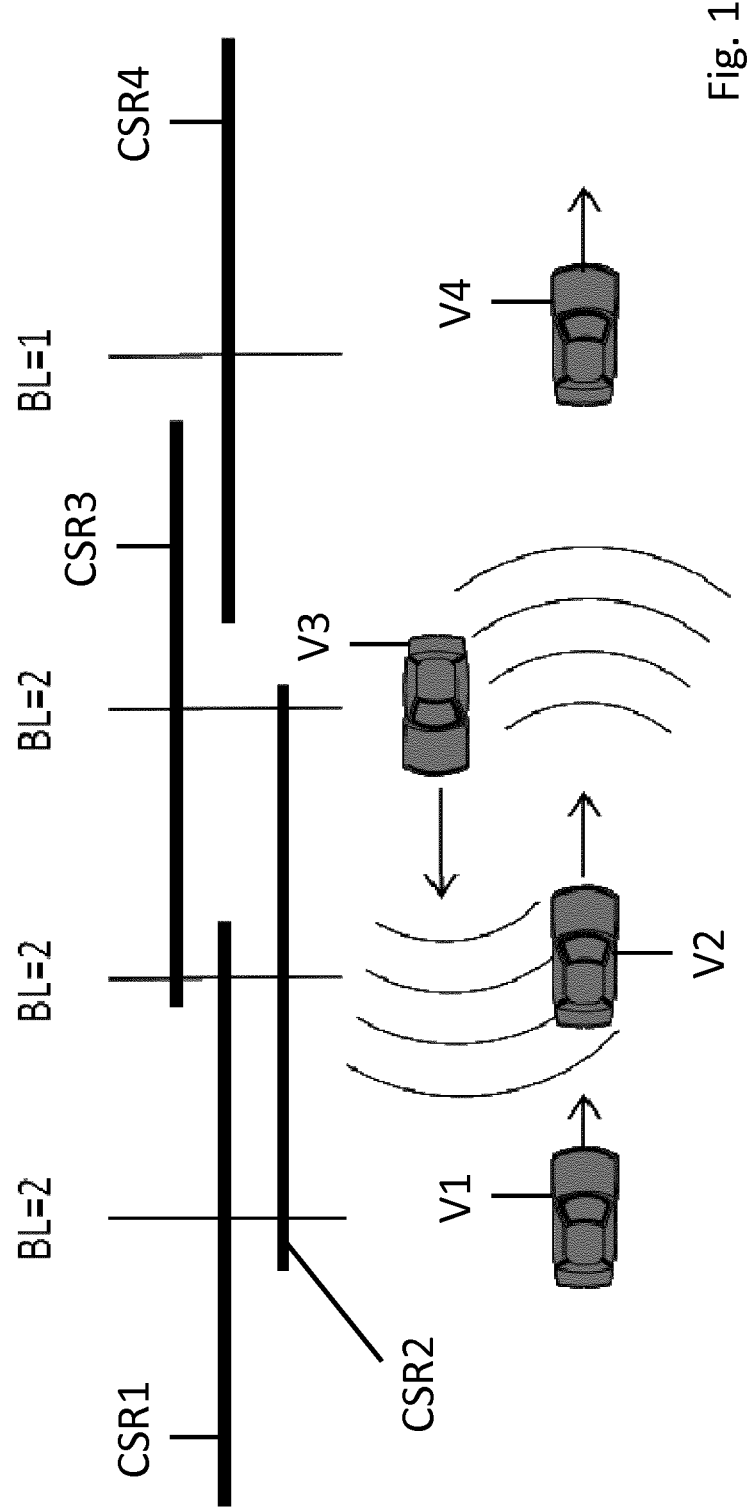
FIG. 1 shows a scenario for a method according to an embodiment of the present invention.

The inventors have recognized that one of the problems of proactive and hybrid methods is to correctly estimate the load in the wireless communication channels. Another problem recognized and addressed by the inventors is how to determine a mapping from transmit power levels of individual stations to a carrier sense range with a low protocol overhead.

In an embodiment, the present invention provides a method and a system for operating stations in a cooperative station network, which reduces protocol overhead.

In an embodiment, the present invention also provides a method and a system for operating stations in a cooperative station network which enable a more precise determination of the channel load.

In an embodiment, the present invention further provides a method and a system for operating stations in a cooperative station network based on locally collected information.

In an embodiment, the present invention even further provides a method and a system for operating stations in a cooperative station network enabling a network load in general below a pre-given threshold under highly changing conditions of stations.

In an embodiment, the present invention even further provides a method and a system for operating stations in a cooperative station network enabling an easy implementation with little additional complexity.

According to an embodiment, a method is defined to operate stations in a cooperative station network, preferably a vehicular ad hoc network comprising stations which transmit signals and receive signals from other stations.

The method according to an embodiment includes:
a) Determining a path loss between at least two stations,
b) Determining a carrier sense range for signals of a station based on the path loss and received power of signals from other stations,
c) Determining a load on a dedicated signal exchange channel based on the carrier sense range according to step b),
d) Determining a maximum output power for a station based on the determined load according to step c), and
e) Operating the station by adjusting the output power of the station, so that the output power is below the determined maximum output power for this station, at least on average.

A system for operating stations in a cooperative station network is defined, preferably the vehicular ad hoc network, comprising stations, wherein the stations transmit signals and receive signals from other stations, preferably for performing with the method according to the embodiments of the present invention.

The system includes:
A pass loss device operable to determine a path loss between at least two stations,
A range device operable to determine a carrier sense range for signals of a station based on the path loss and received power of signals from other stations,
A load device operable to determine a load on a dedicated signal exchange channel based on the carrier sense range,
A power determining device operable to determine a maximum output power for a station based on the determined load and An operating device operable to adjust the output power of the station, so that the output power is below the maximum output power for this station, at least on average.

According to an embodiment of the invention, it has been recognized that network congestion in the cooperative station network is prevented.

According to an embodiment of the invention, it has been further recognized that the method and the system are independent of a centralized coordinating infrastructure.

According to an embodiment of the invention, it has been further recognized that the network load can be maintained below a pre-defined threshold and protocol overhead in signals between the station is minimized.

According to an embodiment of the invention, it has been further recognized that relevant parameters for determining the output power are derived from locally collected information, in particular from signals from other stations.

According to an embodiment of the invention, it has been further recognized that the method and the system are easy to implement without extensive modifications to existing/conventional methods and systems.

According to a preferred embodiment, a one slope path loss model is used for determining the path loss, preferably based on wavelength of the signals, distance to other stations and/or a path loss exponent. One of the advantages with a one slope path loss model is that the path loss can be determined with sufficient accuracy while at the same time providing an easy and fast determination.

According to a further preferred embodiment, a fading intensity is determined for determining the path loss and preferably modeled by a shape parameter. By determining the fading intensity a more realistic, i.e. more precise value for the path loss can be determined. When the fading intensity is modeled by a shape parameter an easy and fast calculation of the fading intensity is possible.

According to a further preferred embodiment, the receive power is determined based on a gamma-distribution with the shape parameter and/or the receiving station sensitivity. By using the gamma-distribution the received power at a point at a certain distance from a transmitter can be modeled being above the sensitivity S of the receiver. A probability p may be expressed in terms of the gamma-function:

$$p_{CS}(y) = Pr(F > SAy^\beta)$$
$$= 1 - F_F(SAy^\beta)$$
$$= \frac{\Gamma\left(m, \frac{SAy^\beta m}{p}\right)}{\Gamma(m)}$$

Where $\Gamma(m, x)$ is the upper incomplete gamma-function, S is the sensitivity of the receiver, A is $4\pi/\lambda^2$ with $\lambda$ being the wavelength of the carrier, $\beta$ being the path loss exponent and m being the shape parameter.

According to a further preferred embodiment, for determining the channel load, neighbour station information, preferably signal sending rate, signal size and/or station density is used. This enables a fast and reliable determination of the channel load with easy-to-access respectively easy-to-determine parameters such as sending packet rate, data rate, etc.

According to a further preferred embodiment, a Nakagami-m model is used for determining the received power. By using the Nakagami-m model a precise determination of the attenuation of wireless signals traversing multiple paths is enabled.

According to a further preferred embodiment, the station density is based, preferably estimated, on the number of neighbour stations in the carrier sense range. This enables a realistic, i.e. with sufficient accuracy, determination of the station density in a fast and efficient way. For example the average number of neighbours discovered $\hat{N}$ is divided by the average transmission range/carrier sense range $r_{CS}$ of signals so that the vehicle density is $\hat{N}/2r_{CS}$. This enables in particular in high channel load conditions a more reliable determination of the number of neighbours and therefore the station density: In high channel load conditions the vehicles cannot determine or estimate the real number of neighbours due mainly to hidden-station collisions that corrupt station signal reception. The interference range $\bar{r}_I$ can then be used to correct the station density $\rho$ in both cases:

$$\hat{\rho} = \frac{\hat{N}}{2r_{CS}(1 - \bar{r}_I(\hat{m}))}$$

According to a further preferred embodiment, a margin is added to the determined maximum output power. In reality the channel load and therefore the determined output power may also vary over an average value when for example parameter estimates are updated in certain time intervals. To guarantee that a communication channel load is strictly below a threshold, for the maximum determined output power a safety margin is added to ensure that the channel load and therefore that the output power of stations based on it is below the determined maximum output power.

According to a further preferred embodiment, for each station, a neighbour station table is created and updated comprising collected information included in signals form other neighbour stations. This provides and easy access to information collected from neighbour stations which may be kept and updated every time a new signal is received.

According to a further preferred embodiment, entries of a neighbour station table are removed after a pre-given time-period. This enables on the one hand a very flexible way to adapt the neighbour station table: For example if the pre-given time-period, the table update time, is too high, then stations may overestimate the number of neighbours so the time period has to be adapted according to changing conditions, for example with respect to station density.

According to a further preferred embodiment, this station density is determined based on a measured channel business time and on data rate, signal rate and signal size of received signals from other stations. By using the channel business time, the number of neighbour stations is not overestimated if no other kind of traffic is present. For example the station density $\hat{\rho}$ may be estimated based on the average number of neighbour stations as follows: $\hat{N}=(\hat{c}V_t)/(b_r b_s)$, where $V_t$ is the transmission bitrate in bps, $\hat{c}$ is the channel business time measured over a period of time, $b_s$ is the signal size in form of the beacon size and $b_r$ is the signal rate in form of the nominal beaconing rate.

According to a further preferred embodiment, the interference range is used to correct the station density when interferences and/or a channel load are above a certain threshold. This enables to initiate interference correction for use only under high load conditions. When for example the channel load, for example represented by the channel business time falls below a given threshold the interference correction is deactivated. Therefore, a more complicated determination of the station density is only used in cases where interferences or channel load avoid a realistic respectively precise determination of the station density, thus avoiding unnecessary and complicated calculation when not needed.

According to a further preferred embodiment, the carrier sense range for determining the station density is estimated by the average transmit power used by neighbour stations. The parameter of the average transmit power used by neighbour stations can be easily measured respectively determined, so that the station density via the carrier sense range can be determined in a fast and efficient way.

According to a further preferred embodiment, the signal is provided in form of a beacon signal. Beacon signals are signals which are regularly respectively periodically sent and can therefore be used for vehicle safety applications in vehicular networks.

In FIG. 1, different vehicles V1, V2, V3, V4 are shown, wherein the vehicles V1, V2 and V4 travel form left to right and vehicle V3 travels from right to left. Further, the beacon load BL is shown for each vehicle V1, V2, V3 and V4. In this one-dimensional model the carrier sense ranges CSR1, CSR2, CSR3 and CSR4 corresponding to the vehicles V1, V2, V3 and V4 are shown with horizontal lines.

Vehicle V1 with the carrier sense range CSR1 has therefore a beacon load BL=2, since the carrier sense ranges CSR2 and CSR3 are overlapping with the carrier sense range CSR1: vehicle V1 receives beacons from vehicle V2 and vehicle V3.

Vehicle V2 receives beacons (beacon load BL=2) from the vehicle V1 and the vehicle V3, since the carrier sense range CSR2 of the vehicle V2 overlaps with the carrier sense ranges CSR1 and CSR3 of the vehicles V1 and V3. Vehicle V3 has a beacon load BL=2, since the carrier sense range CSR3 of the vehicle V3 overlaps with the carrier sense ranges CSR2 and CSR4. Vehicle V4 with its carrier sense range CSR4 has only a beacon load BL=1, since the carrier sense range CSR4 overlaps only with carrier sense range CSR3 of vehicle V3.

Figure 2:
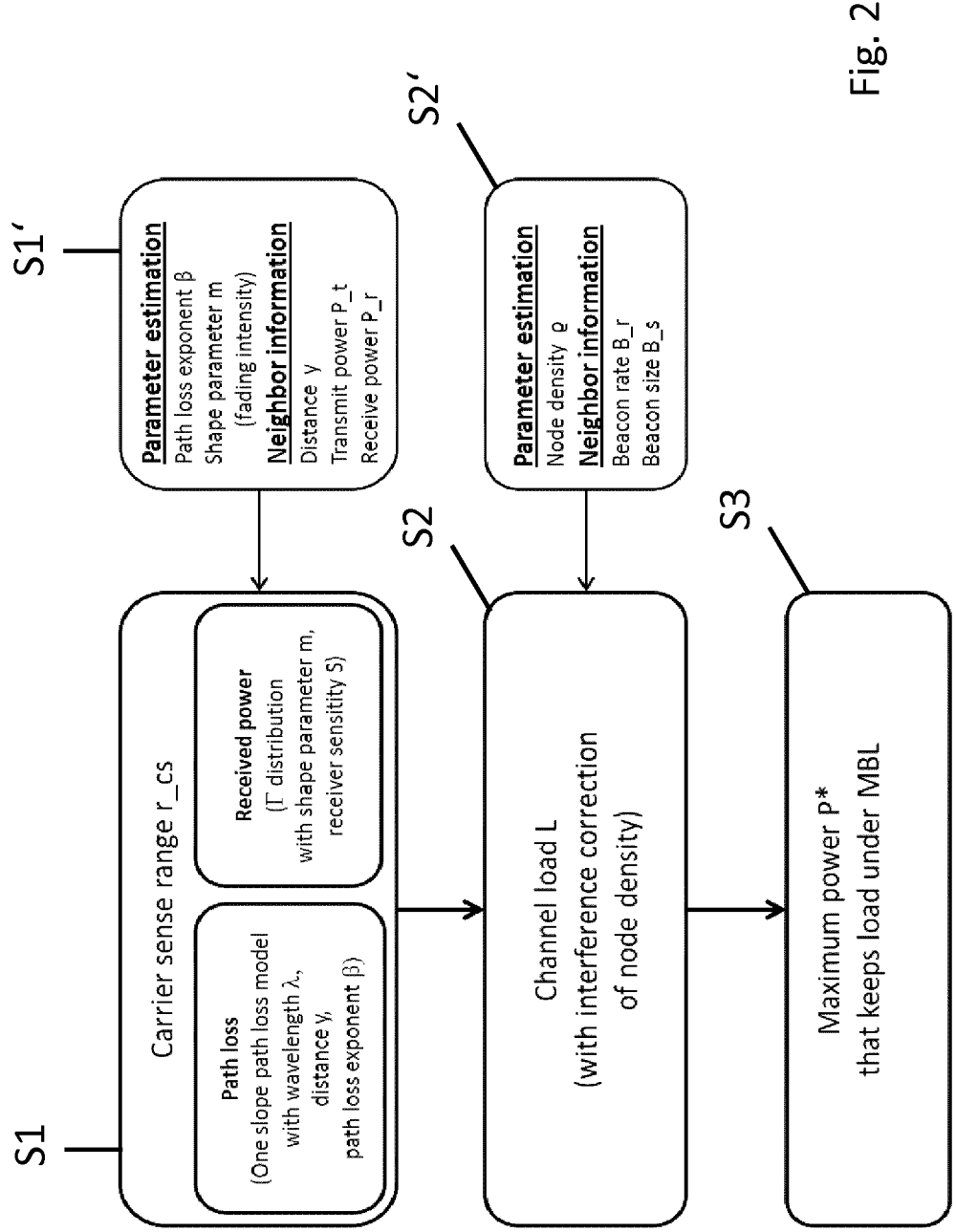
FIG. 2 shows a method according to an embodiment of the present invention.

FIG. 2 shows a method according to an embodiment of the present invention.

In FIG. 2, main steps of the method according to an embodiment of the present invention are shown in a flow chart.

In a first step S1, the carrier sense range r_cs is determined based on path loss with a one slope path loss model with wavelength λ, distance y and path loss exponent β and based on the receive power P_r, determined by a Γ-distribution with shape parameter m and receiver- or station-sensitivity S.

In a further Step S1', a parameter estimation for the path loss exponent β and the shape parameter m for modeling fading intensity is estimated and neighbour information for the path loss determination like distance y, transmit power P_t and receive power P_r are determined.

In a second step S2, the channel load L, preferably with interference correction of the station density p is determined based on the carrier sense range r_cs of step S1.

For determining the channel load L, in a further step S2', a parameter estimation for the node- or station-density ρ is performed and further, neighbour information, preferably signal rate and signal size, here beacon rate B_r and beacon size B_s are used.

In the third step S3, the maximum power P* that keeps the channel load under the maximum beacon load is determined.

If necessary the output power of the corresponding station is then adjusted accordingly, so that the output power is below the maximum output power.

In particular, a method according to a further embodiment of the invention may be performed as follows:

As an assumption a vehicular network is considered in one dimension having a traffic flow with an average density of vehicles ρ per meter. Further, it may be assumed that vehicles transmit with a constant power p over a fading channel with path loss attenuation. It may be assumed that fading is a Fast-Term- or Rayleigh-fading. Based on these assumptions the power of a signal received at a location y from a transmitter at a position x is then pF/l(|x−y|), where l(x) is a path loss attenuation model and F is an exponential random variable with mean 1. pF may be interpreted as a "virtual power" which is exponentially distributed with mean p, that is, receive power becomes F/l(|x−y|), where the transmit power is now an exponential random variable F with parameter $\mu=p^{-1}$.

It may further be assumed, that the received power follows a gamma-distribution according the more general Nakagami-m model with parameters m and μ being a shape and a scale parameter. The virtual power is then a random variable F, whose probability distribution function is $$f_F(x) = \frac{(\mu x)^{m-1} \mu e^{-\mu x}}{\Gamma(m)},$$

where Γ(x) is the gamma-function and the parameter μ=m/p to get an average power of p. The fading intensity is given by the parameter m, wherein a lower value applies more severe fading conditions. When the parameter m has the value 1, this corresponds to Rayleigh fading.

To model the path loss, a one slope path loss model $l=Ax^\beta$ is used, where $A=(4\pi/\lambda)^2$, λ is the wavelength of the carrier signal and β is the so-called path loss exponent.

With the aforementioned assumptions, respectively formulas the probability that the receive power at a point of distance y from a transmitter is above the sensitivity F of the receiver may be expressed as follows:

$$p_{CS}(y) = P_r(F > SAy^\beta) = 1 - F_F(SAy^\beta) = \frac{\Gamma\left(m, \frac{SAy^\beta m}{p}\right)}{\Gamma(m)}$$

where Γ(m, x) is the upper incomplete gamma-function.

Assuming that the transmission range or carrier sense range is a random variable r, then Pr(r>y) is equal to $p_{CS}(y)$. Since $F_r(y)$ is 0 for y<0 the average value $r_{CS}$ may be calculated as follows:

$$r_{CS} = \int_0^\infty \frac{\Gamma\left(m, \frac{SAy^\beta m}{p}\right)}{\Gamma(m)} dy$$

$$= \frac{1}{\Gamma(m)} \int_0^\infty \int_{\frac{SAy^\beta m}{p}}^\infty t^{m-1} e^{-t} dt\, dy$$

Carrier sense range corresponds to transmission range as that one where the signal from a receiver can be detected. For a packet to be correctly decoded the Signal to Interference-plus-Noise Ratio SINR has to be greater than a certain value T, which results in a smaller effective transmission range. However, both cases are equivalent: The channel is considered busy and so it is not available for transmission.

A channel business time CBT may be defined as the fraction of time that a receiver considers the channel occupied in a time interval. The channel business time CBT is commonly measured and made available by the stations.

When assuming that all vehicles used the same power, the average channel load may be given by $$L=2r_{CS}\rho b_r b_s$$

where $b_r$ is the average beaconing rate in hertz or beacons/s, $b_s$ the average beacon size in bits, and L is expressed in bps.

Based on the average carrier sense range $r_{CS}$ and the average channel load, the maximum power to be used to keep the average load under a given maximum beacon load $L_m$, can be determined as follows:

$$p^* = SAm\left(\frac{L_M \Gamma(m)}{2\rho b_r b_s \Gamma\left(m+\frac{1}{\beta}\right)}\right)^\beta$$

Every vehicle may compute the maximum power $p^*$ and may adjust its output power accordingly so that the general load is under the maximum beacon load $L_m$, according to vehicle density $\rho$ and to general conditions, summarized by respectively represented by the path loss exponent $\beta$ and the shape parameter m. Since these values are known a priori and may change over time, vehicles may periodically estimate them from the information they have available.

To control the congestion in the channel, load which is generated by surrounding neighbours, may be measured, either using the station- or node-density, here the vehicle density or the channel distance time and the transmit power respectively output power is increased or decreased according the maximum power $p^*$ using the estimated channel parameters.

The estimation of channel parameters maybe performed as follows and in advance the following assumptions are made: Since the transmission range and station density/ vehicle density/node density are independent random variables, the average channel load is given by the multiplication of their average values. The beaconing rate is not independent of other variables so three rates maybe distinguished: The nominal beaconing rate $b_r$, the transmitted beaconing rate $b'_r$ and the effective beaconing rate $\bar{b}_r$. The first one is the beaconing offered load, whereas $b'_r$ is the beacon rate actually transmitted by the vehicle after medium access control operation contributing to channel load. At high load conditions the medium access control saturates and beacons are discarded. Therefore the beacon rate $b'_r$ depends on the vehicle density.

In the following, it is further assumed that transmit power control reduces the number of neighbour vehicles before their medium access control enters saturation. Therefore it is assumed that $b_r \approx b'_r$ and is independent of vehicle density and transmit power. The effective beaconing rate $\bar{b}_r$ is the rate of beacons correctly received from a neighbour vehicle. Once transmit power control is enabled, the effective beaconing rate is determined by fading and hidden node collisions. The fraction of packet lost due to fading is accounted for with the average carrier sense radius $r_{CS}$ and so the nominal beaconing rate is the correct rate to be used in equation above for the average channel load L. To account for the losses due to hidden-node collisions, wherein the term "node" or "station" is here used as another term for vehicle, the estimated communication range may be estimated under interference which is described in the following.

Further, it is assumed that the vehicle will consider the channel busy either if the vehicle may decode packets or they are corrupted by a hidden-node collisions or interference. Since however part of the interfered transmissions overlap, the measured channel business time CBT is lower than the corresponding average channel load determined with the corresponding equation above. For controlling the congestion in the vehicle or network this provides sufficient accuracy since the channel load overestimation results in lower transmit power $p^*$ which represents a worst case approach. The estimated communication range under interference can be used to estimate the fraction of packets lost by hidden-node collisions and correct the value of the average channel load L.

Even further, in the following it is assumed that beaconing rate $b_r$ and beacon size $b_s$ is constant. It is further assumed that the transmitted power is not converged to a single value for every vehicle, since in reality vehicle signal output power can only take discrete values and vehicles may use or determine different values of the transmit power.

Even further, it is assumed that the transmit power is expected to vary over an average value as the environment estimates for parameters are updated. It is assumed and expected that the channel load oscillates around the determined maximum beacon load value, so that a safety margin may be assigned.

Channel conditions are reflected on the path loss exponent $\beta$ and the shape parameter m. Vehicles may estimate their value from the information carried by beacons collected from other vehicles and their own low-level measurements. That is, for the path loss exponent a single slope model is assumed and vehicles may collect a sample of it from every beacon as follows:

$$\beta_i = \frac{\ln\left(\frac{P_{t,i}}{\Delta P_{r,t}}\right)}{\ln(\Delta_x)}$$

ln ( ) is the natural logarithm; $P_{t,i}$ and $P_{r,j}$ are respectively the transmit and received power for the packet, and $\Delta_x$ is the distance between transmitter and receiver.

$P_{t,i}$ and the vehicle position are part of the information usually carried by beacons, whereas $P_{r,i}$ can be provided by conventional network hardware. The estimate for the path loss exponent $\hat{\beta}$ is simply the sample mean of the last $N_\beta$ collected samples.

To estimate the shape parameter m, samples of the virtual power F, which is gamma distributed, may be used and so it may be varied from the transmit power reported in beacons. Thus, vehicles collect samples of the virtual power $F_i$ from the received power as $$F_i = AP_{r,i}(\Delta_r)^\beta$$

To estimate the shape parameter m, an Erlang distribution is assumed and the shape parameter m is approximated by its nearest integer. To estimate the shape parameter m, the following formula providing a simpler and better estimation for a smaller number of vehicles is used:

$$\hat{m} = \frac{(\bar{F})^2}{S^2} - \frac{1}{N_m}$$

where $\bar{F}$ and $S^2$ are the sample mean and sample variance respectively over a sample of size $N_m$.

To estimate the communication range, in a first step, the interference range for the assumed Nakagami-m model may be calculated. To determine this interference range $r_I$, the following assumptions are made: It is first assumed that correct packet reception depends on the SINR being greater than a given threshold T. Further, it is assumed that noise is negligible compared to interference. Further, only a single interferer is considered to be present. Even further, it is assumed that a saturated situation is present where all stations/nodes have always a packet to transmit providing an approximation for high load conditions. The interference range may be then determined as follows:

$$r_I(m) = r_{CS} \frac{\mu_T^m}{(m-1)!} \sum_{i=0}^{m-1} \frac{1}{i!} \left[ \int_1^\infty \frac{\left(\frac{\mu_H}{T}(\alpha-1)^\beta\right)^i}{\left(\mu_T + \frac{\mu_H}{T}(\alpha-1)^\beta\right)^{m+i}} \cdots \frac{\left(m+\frac{1}{\beta}\right)_i}{\left(1+\frac{\mu_H}{T\mu_T}(\alpha-1)^\beta\right)^{\frac{1}{\beta}}} \frac{\alpha-1}{\alpha} d\alpha \right]$$

$\mu_T = \rho_T^{-1}$ and $\mu_H = \rho_H^{-1}$ are the inverse of the power of transmitter and hidden node (interferer) respectively.

The interference range $r_I$ may be computed in real time by each of the vehicles. As another option their values may be tabulated and stored in each vehicle.

In a next step, a normalized interference range maybe defined $$\bar{r}_I(m) = \frac{r_I(m)}{r_{CS}}$$

and the average estimated communication range interference is then $r_E = r_{CS} - r_I(m) = r_{CS}(1 - \bar{r}_I(m))$.

For instance, for $\beta = 2.5$ and $m = 1$ and very high channel load conditions, a vehicle may be expected to lose up to 60% of all the transmitted beacons.

To correctly estimate the surrounding vehicle density under high load conditions, the vehicles may estimate the vehicle density by the position information collected from neighbour beacons in different manners: One alternative is to just divide the average number of neighbours discovered $\hat{N}$ by the average transmission range $r_{CS}$:

$$\hat{\rho} = \frac{\hat{N}}{2r_{CS}}.$$

This rough estimate maybe refined in several ways: for example in some scenarios the density of vehicles ahead may differ from that of those behind, for example when a vehicle is approaching a traffic jam in a highway. In this case vehicles may estimate forward and backward vehicle densities. In high channel load conditions vehicles however may not reliably know or determine the real number of neighbours due mainly to hidden node collisions corrupting beacon reception. To correct the node density in those cases the interference range is used:

$$\hat{\rho} = \frac{\hat{N}}{2r_{CS}(1 - \bar{r}_I(\hat{m}))}$$

Since channel load may oscillate, moving averages may be used for some estimates to reduce these oscillations. Vehicles may also periodically adapt their transmit power on the basis the estimated environment parameters. Vehicles may collect samples of reception power, transmit power and location from received beacons and keep a table of known vehicles.

After a given sampling period, $T_s$, the maximum power to comply with the maximum beacon load may be calculated channel load and estimates from collected samples. Vehicles may also set the transmit or output power to the largest step available when transmit power may only be set in discrete steps, below the maximum transmit power p*. Vehicles may collect samples of the path loss exponent $\beta_i$ using its own receive power measurements as well as the information about neighbour transmit power used and position carried by received beacons. The estimated path loss exponent $\hat{\beta}$ may be actually determined with a moving average of the last $N_\beta$ samples avoiding oscillation. To estimate the shape parameter m it is assumed that the collected samples are independent and identically distributed. Otherwise this may lead to a wrong estimation. For example the vehicles may collect several steps of samples of their virtual power $F_i$ and determine $\hat{m}$ after collecting $N_m$ samples of a certain step, resetting that step set and perform again.

Vehicles usually keep a neighbour table with information collected from beacons, which may be updated every time a new beacon is received. To account for neighbours leaving, outdated information is deleted after a table update time, which makes the perceived number of neighbours depend on the update time. If for example the value is high, vehicles overestimate the number of neighbour vehicles. An alternative estimate maybe provided by their measured general business time with $$\hat{N} = \frac{\hat{c}V_t}{b_r b_s}$$

where $V_t$ is the transmission bitrate in bps, and $\hat{c}$ is CBT measured over a period of time. The channel business time maybe also corrected by interference correction as mentioned above: When the measured channel business time is above a certain threshold $I_T$ interference correction is triggered and the vehicle density is calculated based on $$\hat{\rho} = \frac{\hat{N}}{2r_{CS}(1 - \bar{r}_I(\hat{m}))}$$

In summary, when the neighbour table is used, the maximum output power p* maybe calculated based on vehicle density and transmission range:

$$p^* = \bar{p}_n \left( \frac{(1 - \bar{r}_I(\hat{m}))L_M}{\hat{N} b_r b_s} \right)^{\hat{\beta}} = \bar{p}_n \left( \frac{(1 - \bar{r}_I(\hat{m}))N_{max}}{\hat{N}} \right)^{\hat{\beta}}.$$

where $\bar{p}_n$ is the previously mentioned average transmit power of the neighbours. The ratio of the maximum beacon load MBL to beaconing rate and beacon size gives the maximum number of neighbours in range to keep that load, so it is called $N_{max}$. Since estimates may be determined periodically every $T_s$ seconds, the transmit power can be expressed as a discrete control $$p^*[n+1] = \left\lfloor \bar{p}_n[n]\left((1-\hat{r}_I[n])\frac{N_{max}}{\hat{N}[n]}\right)^{\hat{\beta}[n]} \right\rfloor$$

To simplify notation $\hat{r}_I[n] = \bar{r}_I(\hat{m})[n]$
and together with $\bar{p}_n[n]$, $\hat{N}[n]$ and $\hat{\beta}[n]$
have been determined from samples collected over the previous $T_s$ seconds.

Similarly, when measured channel business time CBT is used to estimate the number of neighbours, the control is as follows:

$$p^*[n+1] = \left\lfloor \bar{p}_n[n]\left((1-\hat{r}_I[n])\frac{C_{max}}{\hat{c}[n]}\right)^{\hat{\beta}[n]} \right\rfloor$$

$C_{max}$ is MBL expressed as a fraction of data rate and $\hat{n}[n]$ is the measured BT over the previous $T_s$ seconds.

In both cases, $\lfloor x \rfloor$ means that the power selected is the highest power step not greater than x and interference correction is only applied when the load is above a given threshold, otherwise $\hat{r}_I[n] = \bar{r}_I(\hat{m})$.

In an ideal case, with invariant parameters and continuous power, these controls would converge to a single value, but discrete values make the power oscillate even if the rest of parameters do not vary.

Finally, in logarithmic scale both controls have the form $$p^*[n+1] = K_n[n] + K_p[n]e[n]$$

That is, both controls use as error signal e[n] the difference between the maximum load value and the measured value, either expressed as neighbours or channel business time CBT. So these controls are similar to a linear proportional controller, but with a non-tunable proportional gain $K_p$ given by the path loss exponent estimate.

In summary, the present invention prevents network congestions form occurring in cooperative vehicle systems, works decentralized and maintains the network load under a pre-defined threshold. The present invention further provides system parameters which maybe estimated from locally collected information reducing the protocol overhead to a minimum so that no extra information except standard beacon and transmit powers information is added.

Further, the present invention only adds a little complexity to transmit power control implementations and enables a correction of underestimation of a number of neighbours in high load condition by augmenting the known number of neighbours by a factor defined by the interference range.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a plurality of stations in a cooperative station network, wherein each of the stations transmits signals and receives signals from other stations, comprising:
   determining a path loss between at least two of the stations;
   determining a carrier sense range for signals of a first station of the stations based on the path loss and received power of signals from the other stations, wherein the carrier sense range is a transmission range at which a signal can be detected;
   determining a load on a dedicated signal exchange channel based on the determined carrier sense range;
   determining a maximum output power for the first station based on the determined load; and
   operating the first station by adjusting the output power of the first station to be, at least on average below the determined maximum output power for the first station,
   wherein the carrier sense range is an average carrier sense range that is calculated using a probability that a receive power at a distance from a transmitter is above a sensitivity of a receiver, and
   wherein the probability that the receive power at a distance from a transmitter is above a sensitivity of a receiver is calculated using the formula:

$$p_{cs}(y) = P_r(F > SA_y^\beta) = 1 - F_F(SA_y^\beta) = \frac{\Gamma\left(m, \frac{SA_y^\beta m}{p}\right)}{\Gamma(m)}$$

wherein p$_{cs}$ (y) is the probability that the receive power at a distance from a transmitter is above a sensitivity of a receiver, y is the distance from the transmitter, F is the sensitivity of the receiver, A is the wavelength of a carrier, β is a path loss exponent, and m is a shape parameter.

2. The method according to claim 1, wherein, for determining the path loss, a one slope path loss model is used, which is based on wavelength of the signals, distance to the other stations, or a path loss exponent.

3. The method according to claim 1, wherein for determining the path loss, a fading intensity is determined, modeled by a shape parameter.

4. The method according to claim 1, wherein the received power is determined based on a Gamma-distribution with a shape parameter or a sensitivity of the receiving station.

5. The method according to claim 1, wherein neighbor station information is used to determine the channel load.

6. The method of claim 5, wherein the neighbor station information includes one or more of a signal sending rate, a signal size, and a station density.

7. The method according to claim 6, wherein the station density is estimated based on a number of neighbor stations in the carrier sense range.

8. The method according to claim 7, wherein the station density is estimated based on an interference range between the stations or hidden station collisions.

9. The method according to claim 7, wherein, for each of the stations, a neighbor station table is created and updated to comprise collected information included in the signals from the neighbor stations.

10. The method according to claim 9, wherein entries of a neighbor station table are removed after a predetermined time-period.

11. The method according to claim 6, wherein the station density is determined based on a measured channel business time and based on data rate, signal rate and signal size of the signals received from the other stations.

12. The method according to claim 6, wherein an interference range is used, based on interferences or the channel load being above a certain threshold, to correct the station density.

13. The method according to claim 12, wherein, for determining the station density, the carrier sense range is estimated by average transmit power used by neighbor stations.

14. The method according to claim 1, wherein, for determining the received power, a Nakagami-m model is used.

15. The method according to claim 1, wherein a margin is added to the determined maximum output power.

16. The method according to claim 1, wherein the signals are beacon signals.

17. The method of claim 1, wherein the average carrier sense range is calculated using the formula:

$$r_{cs} = \int_0^\infty \frac{\Gamma\left(m, \frac{SA_y^\beta m}{p}\right)}{\Gamma(m)} dy = \frac{1}{\Gamma(m)} \int_0^\infty \int_{\frac{SA_y^\beta m}{p}}^\infty t^{m-1} e^{-t} dt dy$$

wherein r$_{cs}$ is the average carrier sense range, A is the wavelength of a carrier, β is a path loss exponent, and m is a shape parameter.

18. A system for operating a cooperative station network, wherein each of a plurality of stations transmits signals and receives signals from other stations, comprising:

a pass loss device operable to determine a path loss between at least two stations;
a range device operable to determine a carrier sense range for signals of a first station of the stations based on the path loss and received power of signals from the other stations, wherein the carrier sense range is a transmission range at which a signal can be detected;
a load device operable to determine a load on a dedicated signal exchange channel based on the determined carrier sense range;
a power determining device operable to determine a maximum output power for the station based on the determined load; and
an operating device operable to adjust the output power of the station to be below the maximum output power for the first station,
wherein the carrier sense range is an average carrier sense range that is calculated using a probability that a receive power at a distance from a transmitter is above a sensitivity of a receiver, and
wherein the probability that the receive power at a distance from a transmitter is above a sensitivity of a receiver is calculated using the formula:

$$p_{cs}(y) = P_r(F > SA_y^\beta) = 1 - F_F(SA_y^\beta) = \frac{\Gamma\left(m, \frac{SA_y^\beta m}{p}\right)}{\Gamma(m)}$$

wherein p$_{cs}$ (y) is the probability that the receive power at a distance from a transmitter is above a sensitivity of a receiver, y is the distance from the transmitter, F is the sensitivity of the receiver, A is the wavelength of a carrier, β is a path loss exponent, and m is a shape parameter.

19. The system of claim 18, wherein the average carrier sense range is calculated using the formula:

$$r_{cs} = \int_0^\infty \frac{\Gamma\left(m, \frac{SA_y^\beta m}{p}\right)}{\Gamma(m)} dy = \frac{1}{\Gamma(m)} \int_0^\infty \int_{\frac{SA_y^\beta m}{p}}^\infty t^{m-1} e^{-t} dt dy$$

wherein r$_{cs}$ is the average carrier sense range, A is the wavelength of a carrier, β is a path loss exponent, and m is a shape parameter.

20. A method for operating a plurality of stations in a cooperative station network, wherein each of the stations transmits signals and receives signals from other stations, comprising:

determining a path loss between at least two of the stations;
determining a carrier sense range for signals of a first station of the stations based on the path loss and received power of signals from the other stations, wherein the carrier sense range is a transmission range at which a signal can be detected;
determining a load on a dedicated signal exchange channel based on the determined carrier sense range;
determining a maximum output power for the first station based on the determined load; and
operating the first station by adjusting the output power of the first station to be, at least on average below the determined maximum output power for the first station,
wherein the carrier sense range is an average carrier sense range that is calculated using a probability that a receive power at a distance from a transmitter is above a sensitivity of a receiver, and wherein the average carrier sense range is calculated using the formula:

$$r_{cs} = \int_0^\infty \frac{\Gamma\left(m, \frac{SA_y^\beta m}{p}\right)}{\Gamma(m)} dy = \frac{1}{\Gamma(m)} \int_0^\infty \int_{\frac{SA_y^\beta m}{p}}^\infty t^{m-1} e^{-t} dt dy$$

wherein $r_{cs}$ is the average carrier sense range, A is the wavelength of a carrier, $\beta$ is a path loss exponent, and m is a shape parameter.

21. A system for operating a cooperative station network, wherein each of a plurality of stations transmits signals and receives signals from other stations, comprising:

a pass loss device operable to determine a path loss between at least two stations;

a range device operable to determine a carrier sense range for signals of a first station of the stations based on the path loss and received power of signals from the other stations, wherein the carrier sense range is a transmission range at which a signal can be detected;

a load device operable to determine a load on a dedicated signal exchange channel based on the determined carrier sense range;

a power determining device operable to determine a maximum output power for the station based on the determined load; and an operating device operable to adjust the output power of the station to be below the maximum output power for the first station, wherein the carrier sense range is an average carrier sense range that is calculated using a probability that a receive power at a distance from a transmitter is above a sensitivity of a receiver, and wherein the average carrier sense range is calculated using the formula:

$$r_{cs} = \int_0^\infty \frac{\Gamma\left(m, \frac{SA_y^\beta m}{p}\right)}{\Gamma(m)} dy = \frac{1}{\Gamma(m)} \int_0^\infty \int_{\frac{SA_y^\beta m}{p}}^\infty t^{m-1} e^{-t} dt dy$$

wherein $r_{cs}$ is the average carrier sense range, A is the wavelength of a carrier, $\beta$ is a path loss exponent, and m is a shape parameter.

* * * * *